United States Patent
Gammenthaler, Jr. et al.

(10) Patent No.: US 6,826,175 B1
(45) Date of Patent: Nov. 30, 2004

(54) SIGNALING LINK INTERFACE FOR PROCESSING SIGNALING INFORMATION IN A TELECOMMUNICATIONS NETWORK

(75) Inventors: Robert S. Gammenthaler, Jr., Frisco, TX (US); Michael J. Hanlon, Dallas, TX (US); Russell L. Humphrey, McKinney, TX (US); Michael A. Vincze, Garland, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/541,110

(22) Filed: Mar. 31, 2000

(51) Int. Cl.[7] ............................................. H04L 12/66
(52) U.S. Cl. ...................... 370/352; 370/522; 370/469; 379/15.01
(58) Field of Search .............................. 370/352, 353, 370/354–356, 474, 522, 400, 410, 419, 420, 463, 465, 466, 467, 469; 379/9.05, 9.06, 14, 12, 15.01, 18

(56) References Cited

U.S. PATENT DOCUMENTS

| | | | | |
|---|---|---|---|---|
| 5,793,771 A | * | 8/1998 | Darland et al. | 370/467 |
| 5,915,013 A | * | 6/1999 | Mintz et al. | 379/230 |
| 5,987,035 A | * | 11/1999 | Silva | 370/467 |
| 6,167,129 A | * | 12/2000 | Fikis et al. | 379/230 |
| 6,175,574 B1 | * | 1/2001 | Lewis | 370/522 |

FOREIGN PATENT DOCUMENTS

EP    0 592 153 A2    4/1994

OTHER PUBLICATIONS

Doughty et al. H1,898, United States Statutory Invention Registration, Signaling Data Processing, Oct. 3, 2000.*
Pandey & Singh, Validation Testing of Signalling System No. 7, Telecommunications Apr. 1998, pp 11–19.

* cited by examiner

*Primary Examiner*—Seema S. Rao
*Assistant Examiner*—Melanie Jagannathan
(74) *Attorney, Agent, or Firm*—Baker Botts; Craig A. Hoersten; V. Lawrence Sewell (57) ABSTRACT

A signaling link interface (10) includes a high level data link controller (12) that receives signaling information from network elements in a telecommunication network. A link state controller (14) performs message transfer part level two processing on the signaling information. The link state controller (14) generates a response message that the high level data link controller (12) provides back to the network elements. The high level data link controller (12) and the link state controller (14) are implemented in hardware as field programmable gate array devices. Information related to operation of the signaling link interface (10) may be downloaded from a remote site into the field programmable gate array devices. The signaling link interface (10) processes signaling information received from a plurality of signaling links on a link by link basis.

10 Claims, 5 Drawing Sheets

SIGNALING LINK INTERFACE FOR PROCESSING SIGNALING INFORMATION IN A TELECOMMUNICATIONS NETWORK

TECHNICAL FIELD OF THE INVENTION

The present invention relates in general to telecommunications signal processing and more particularly to a signaling link interface for processing signaling information in a telecommunications network.

BACKGROUND OF THE INVENTION

In conventional signal transfer points of a telecommunications network, signaling information is received from a switch for processing in order to facilitate a connection for a telephone call. Typical processing performed by the signal transfer point on the signaling information includes message transfer part level two processing. The algorithms used to perform message transfer part level two processing are typically implemented in software. However, software solutions do not have adequate capacity and throughput capabilities. As such, the cost per port is relatively high. Further, many processors are needed to accomplish several tasks. Therefore, it is desirable to reduce the dependency that signal transfer points have on software implementations in performing signaling information processing.

SUMMARY OF THE INVENTION

From the foregoing, it may be appreciated by those skilled in the art that a need has arisen for the processing of signaling information that is not dependent on software solutions. In accordance with the present invention, a signaling link interface for processing signaling information in a telecommunications network is provided that substantially eliminates or reduces disadvantages and problems found in conventional signal transfer points.

According to an embodiment of the present invention, there is provided a signaling link interface for processing signaling information in a telecommunications network that includes a high level data link controller for receiving signaling information from and providing signaling information to network elements in the telecommunications network. A link state controller performs message transfer part level two processing on the signaling information received by the high level data link controller. The link state controller uses a state machine for the message transfer part level two processing in order to provide a hardware implementation.

The present invention provides various technical advantages over conventional signal transfer points. For example, one technical advantage is to provide a hardware implementation for message transfer part level two processing. Another technical advantage is to use field programmable gate arrays for the hardware implementation. Yet another technical advantage is to provide individual link state information for each link carrying signaling information. Still another technical advantage is to provide remote access for downloading information to the field programmable gate arrays. Other technical advantages may be readily ascertainable to those skilled in the art from the following figures, description and claims.

BRIEF DESCRIPTION OF THE DRAWINGS

For a more complete understanding of the present invention and the advantages thereof, reference is now made to the following descriptions-taken in conjunction with the accompanying drawings, wherein like reference numerals represent like parts, in which.

DETAILED DESCRIPTION OF THE INVENTION

Figure 1:
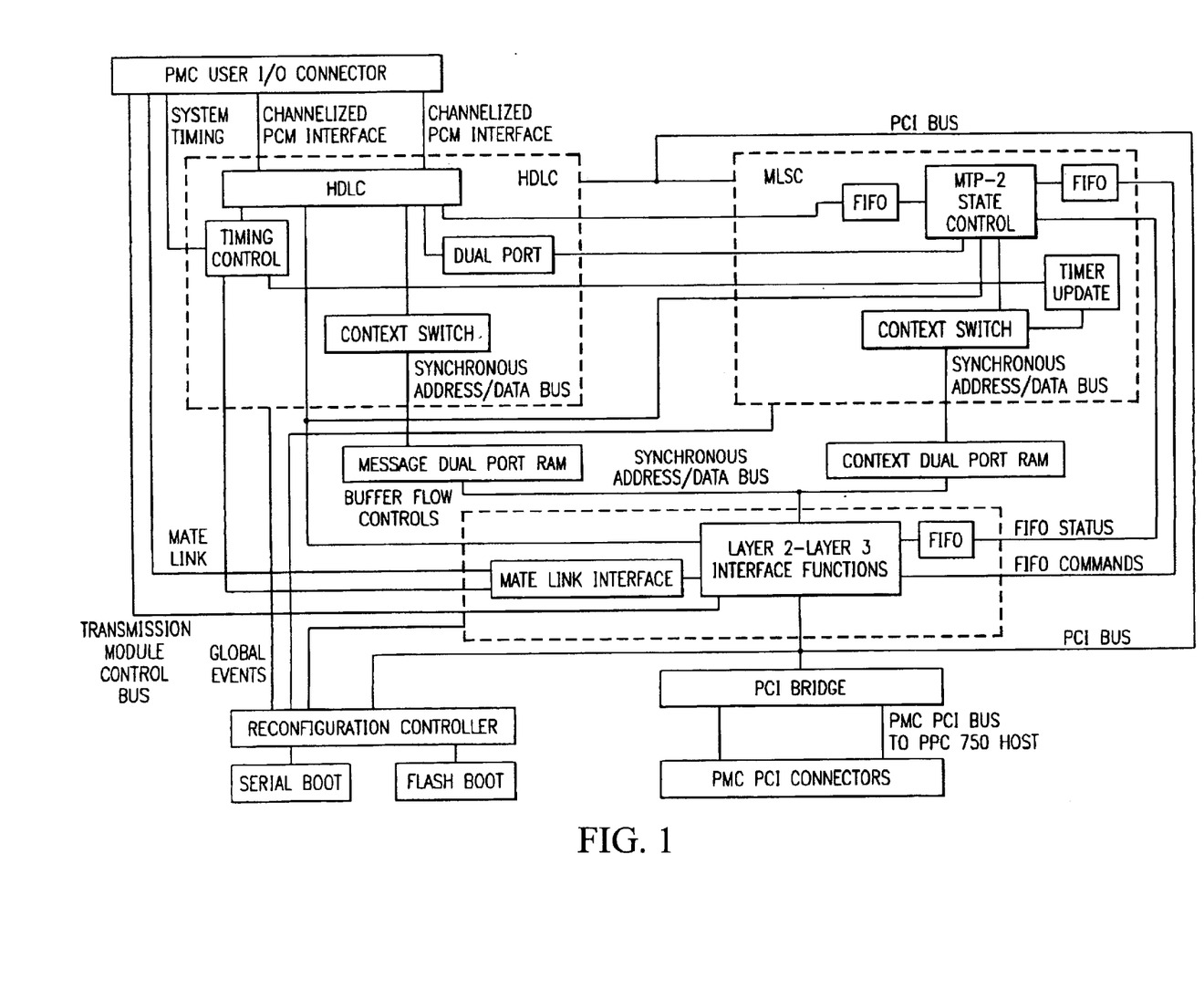
FIG. 1 illustrates a block diagram of a signaling link interface for a signal transfer point in a telecommunications network.

FIG. 1 is a block diagram of a message transfer part level two signaling link interface 10. Signaling link interface 10 includes a high level data link controller (HDLC) 12, a link state controller 14, an interface controller 16, a reconfiguration controller 18, and a peripheral component interconnect (PCI) bridge 20. High data link controller 12 performs physical layer support functions for DS0A and timing as well as other high level data link control type functions. Link state controller 14 performs American National Standards Institute state machine functions. Interface controller 16 performs messaging and other control functions. Reconfiguration controller 18 provides initialization for signaling link interface 10. PCI bridge 20 provides a communication interface for information transfer to and from signaling link interface 10.

HDLC 12, a link state controller 14, and interface controller 16 couple to a message dual port memory 22 and a context dual port memory 24. Context dual port memory 24 stores current state and control information for link state controller 14. Message dual port memory 22 stores messages for retrieval or in preparation for transmission. Message dual port memory 22 also contains state information for HDLC 12. Signaling link interface 10 is part of a signal transfer point which is more completely described in U.S. patent application Ser. No. 09/539,917, which is hereby incorporated by reference herein.

Figure 2:
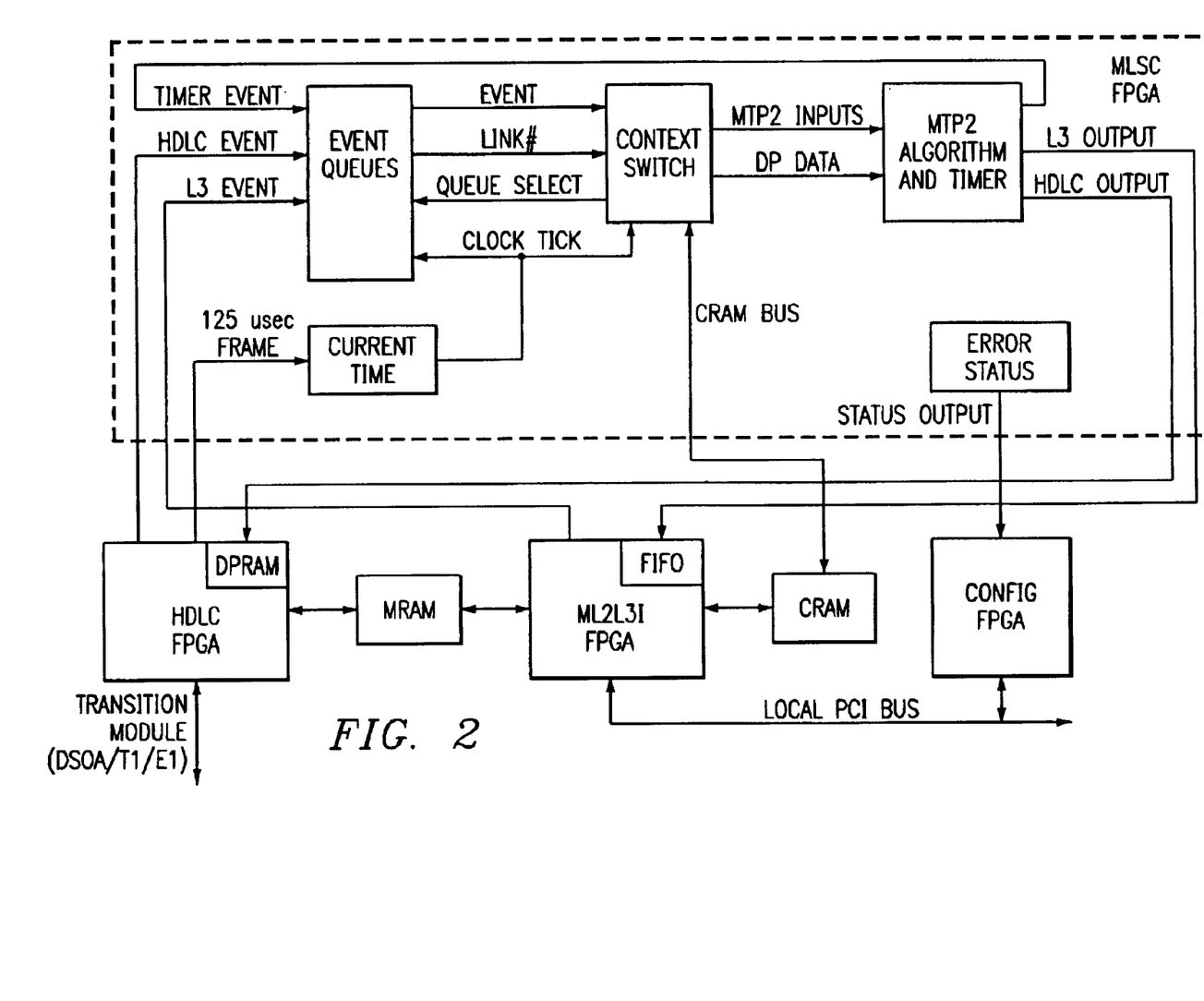
FIG. 2 illustrates a block diagram of a link state controller in the signaling unit.

FIG. 2 is a block diagram of link state controller 14. Link state controller 14 handles signal unit selection, sequencing, alignment, timers, and traffic metering and measurement features. Link state controller 14 operates on a single link at a time by detecting events. An event includes any input from interface controller 16 or HDLC 12 and a timer event internal to link state controller 14. Upon completing an operation on an event, link state controller 14 generates an output that is appropriately passed on to interface controller 16, high level data controller 12, or reconfiguration controller 18. The state of each link between events is partially stored internally and partially stored in context dual port memory 24. As an event is detected for a link, data from context dual port memory 24 is loaded into link state controller 14 for that link, the event is processed, and data is updated and stored back into context dual port memory 24.

Link state controller 14 includes a current time generator 30, an event queue 32, a context switch 34, an algorithm and timer unit 36, and an error status unit 39. Current time generator 30 generates a clock signal in response to a reference signal provided by HDLC 12 in order to drive event -queue 32 and context switch 34. Current time generator 30 also generates a heartbeat timer to allow host processor 11 to detect operation of link state controller 14.

Current time generator 30 preferably produces an elapsed time since reset signal in tens of milliseconds and a 33 mhz pulse every ten milliseconds. These outputs are derived by dividing a 125 microsecond frame signal received from HDLC 12 by eighty. Error status unit 39 collects hardware errors, such as parity errors and buffer overflows, and reports them to reconfiguration controller 18. Each error is stored as a bit in a 32 bit register and reported over a serial link whenever a single bit in the data changes. If a bit gets changed during the transmission of serial data, the data will be retransmitted.

Event queue 32 has a set of buffers to receive each event. Event queue 32 may receive an event from HDLC 12, interface controller 16, or an internal algorithm and timer unit 36. Event queue 32 also includes a timer update function. The timer update function is responsible for incrementing each link's timer every ten milliseconds and for checking their expiration. Context switch 34 selects which of the events stored in event queue 32 is to be processed and loads the data for the corresponding link into the algorithm and timer unit 36 from context dual port memory 24. Preferably, events from HDLC 12 are handled first followed by timer events from algorithm and timer unit 36 and interface controller 16 events. Once algorithm and timer unit 36 finishes processing an event, context switch 34 stores the associated link's new state in context memory 24. The functionality of algorithm and timing unit 36 is described in ANSI T1.111.3 but has been generalized and replicated in Appendix A as it pertains to link state controller 14.

An HDLC event occurs whenever a command is issued from HDLC 12 as in when a signal unit has been transmitted, received, or requested. An HDLC event includes a command and the link for which it applies. An interface controller 16 event occurs whenever a command is issued from host processor 11 through interface controller 16. An interface controller 16 event includes the command and the link for which it applies. A timer event occurs whenever one of the timers within algorithm and timing unit 36 expires. The timer event includes which one of the timers has expired and which link it applies.

Commands received from interface controller 16 by link state controller 14 may be in preferably one, two, and three bytes. A one byte command applies to all links. A two byte commands apply to a single link. Three byte commands apply to the mate link.

Status provided to interface controller 16 from link state controller 14 is preferably sent in either two or six bytes. Two bytes are sent for a level two status, message memory status, or test mode status. Six bytes are sent for a mate link status.

Reconfiguration controller 18 provides a maskable interrupt for link state controller 14. reconfiguration controller 18 includes a 32 bit status register and a 32 bit enable interrupt register, Link state controller 14 is responsible for updating the 32 bit status register. In response to updates received from link state controller 14, reconfiguration controller 18 manages the interrupt enable register, reads and clears the status register, and generates an appropriate interrupt through PCI bridge 20. Link state controller 14 communicates with reconfiguration controller 18 over a serial link accompanied by an enable.

Link state controller 14 accesses one side of context memory 24. Link state controller 14 accesses context memory 24 for context switching and configuration. For link state controller 14, context memory 24 includes state information for state machine registers, traffic metering and measurement values for received and transmitted signal units, and provisional/current timer values.

For outbound operation, interface controller 16 receives outbound messages from the host processor through PCI bridge 20 and stores the message in message memory 22. HDLC 12 in turn transmits the message as controlled by link state controller 14. Link state controller 14 controls this process by providing a FORWARD SEQUENCE NUMBER (FSN) (stored in context memory 24) for interface controller 16 (so interface controller 16 knows which message to retrieve from the host processor) and by detecting when message memory 22 is ready with a message to be transmitted. Message memory 22 includes two buffers for each link's outbound message in order to allow one buffer to transmit while the other buffer is being filled.

For an outbound message signal unit, interface controller 16 detects which link to transmit a message on. The message can be initiated from the host processor or can be initiated from link state controller 14 as a retransmit. Regardless, interface controller 16 looks at the FSN stored in context memory 24. If the FSN has changed since the last check, a message corresponding to the FSN is placed in message memory 22 transmit buffer. Interface controller 16 checks which transmit buffer is available and fills the appropriate buffer with header information, the FSN, and the message. A transmit buffer is available when its corresponding status bit is not set. Once the appropriate transmit buffer is full, its status bit is set to indicate the buffer is not available. Interface controller 16 notifies link state controller 14 of which buffer is full.

Link state controller 14 receives notification from interface controller 16 of which transmit buffer in message memory 22 is full and sets a ready bit to indicate that the appropriate transmit buffer is ready for transmission. HDLC 12 makes a request for a signal unit and continuously does so upon transmitting a signal unit. Link state controller 14 polls its event queues 32, performs a context switch, implements the algorithm in algorithm and timer unit 36, and determines that a request for a signal unit has been made. Link state controller 14 determines which message memory 22 transmit buffer is ready for transmission and so notifies HDLC 12. Such notification includes a backward indicator bit, a backward sequence number, and a forward indicator bit. Upon receiving the notification, HDLC 12 detects a message signal unit needs to be transmitted.

HDLC obtains the FSN from the message memory 22 transmit buffer and transmits the message signal unit over an appropriate signaling link. Upon transmission, HDLC 12 notifies link state controller 14 of which buffer has been transmitted. Link state controller 14 receives the identity of the transmit buffer and clears the appropriate ready bit to indicate that the transmit buffer has no message ready for transmission. Link state controller 14 notifies interface controller 16 of the identity of the freed up transmit buffer. Interface controller 16 clears the status bit of the freed up transmit buffer to indicate that the transmit buffer is ready to be filled with a new message.

For inbound operation, HDLC 12 receives inbound messages from an appropriate signaling link and stores the message in message memory 22. Interface controller 16 passes the message to the host processor. Link state controller 14 controls this process and detects when message memory 22 is ready with a message to be passed to the host processor. Message memory 22 includes two buffers for each signaling link's inbound messages in order that one buffer can pass the message to the host processor while the other buffer can receive a message from the signaling link. Link state controller 14 is responsible for verifying the sequence numbers and indicator bits for the inbound messages. If a message is received correctly, interface controller 16 is notified to transfer the message to the host processor. If the message is not received correctly, notification is not performed and the message is discarded.

For an inbound message signal unit, HDLC 12 receives the signal unit and places error free messages into one of two receive buffers in message memory 22. HDLC 12 alternates placement of signal units among the two buffers. the flow of information is fast enough to accommodate this technique so that at any time at least one of the buffers is available to HDLC 12. Once the selected buffer is full, HDLC 12 notifies link state controller 14 of the identity of the filled receive buffer. Link state controller 14 receives this notification and sets a status bit for the appropriate receive buffer to indicate that it has been filled. If the status bit is already set, an error has occurred and HDLC 12 has overwritten one of the receive buffers before its contents were transferred to the host processor. This error condition is passed on to reconfiguration controller 18 for processing. Upon successful status bit setting, link state controller 14 polls event queues 32, performs a context switch, and performs algorithm and timer unit 36 implementation. If message signal unit sequence numbers or indicator bits are bad, link state controller 14 clears the status bit and awaits for an indication that a receive buffer is full before reprocessing.

If everything is verified, link state controller 14 notifies interface controller 16 of the identity of the receive buffer to pass the message to the host processor. Interface controller 16 receives the notification of the identity of the receive buffer and extracts the message therefrom to be passed on to the host processor. Upon message transmission, interface controller 16 notifies link state controller 14 of the freeing up of the receive buffer. in response to the notification, link state controller 14 clears the appropriate status bit to indicate that the receive buffer is available to receive a new message.

Figure 3A:
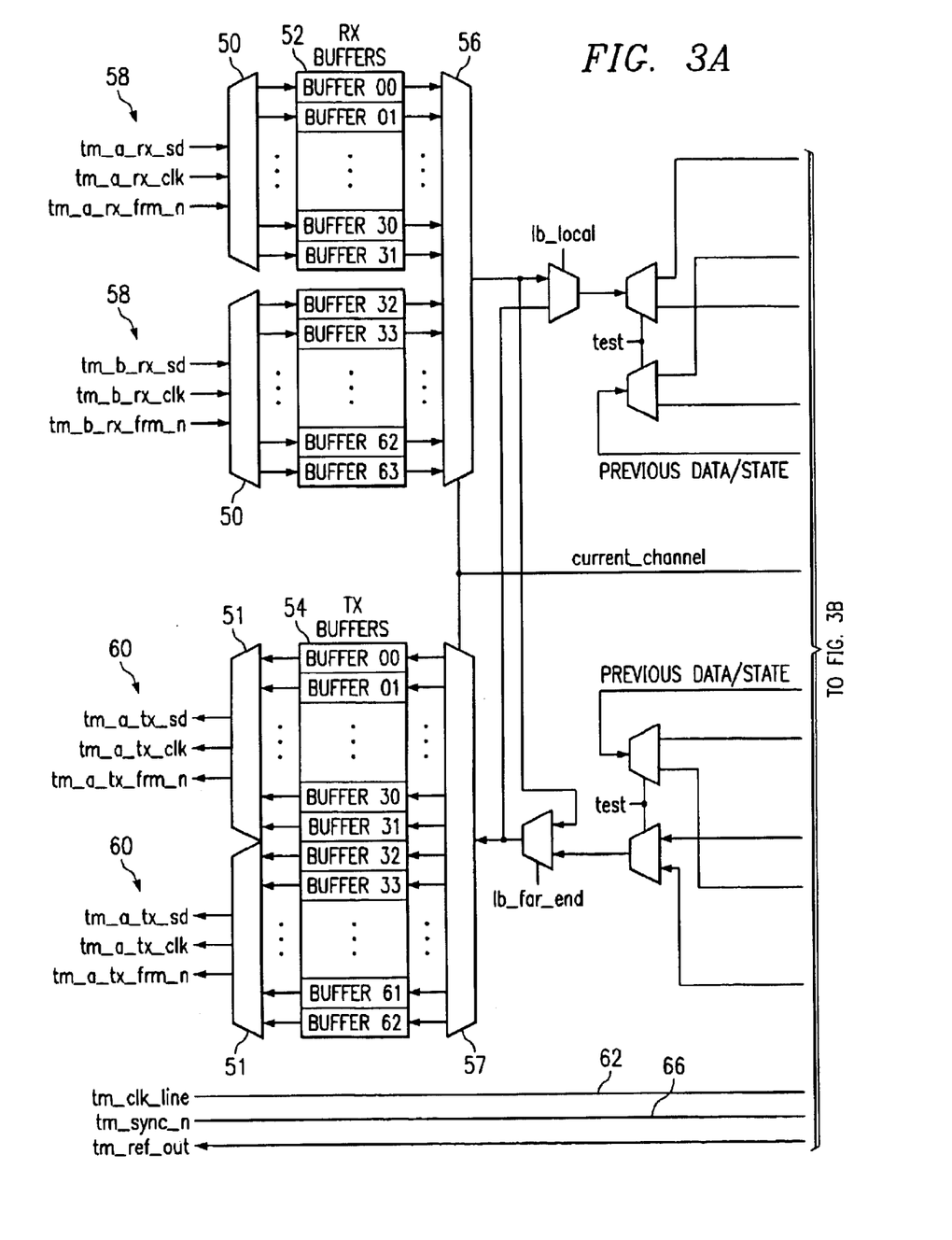
FIG. 3 illustrates a block diagram of a high level data link controller in the signaling link interface.
Figure 3B:
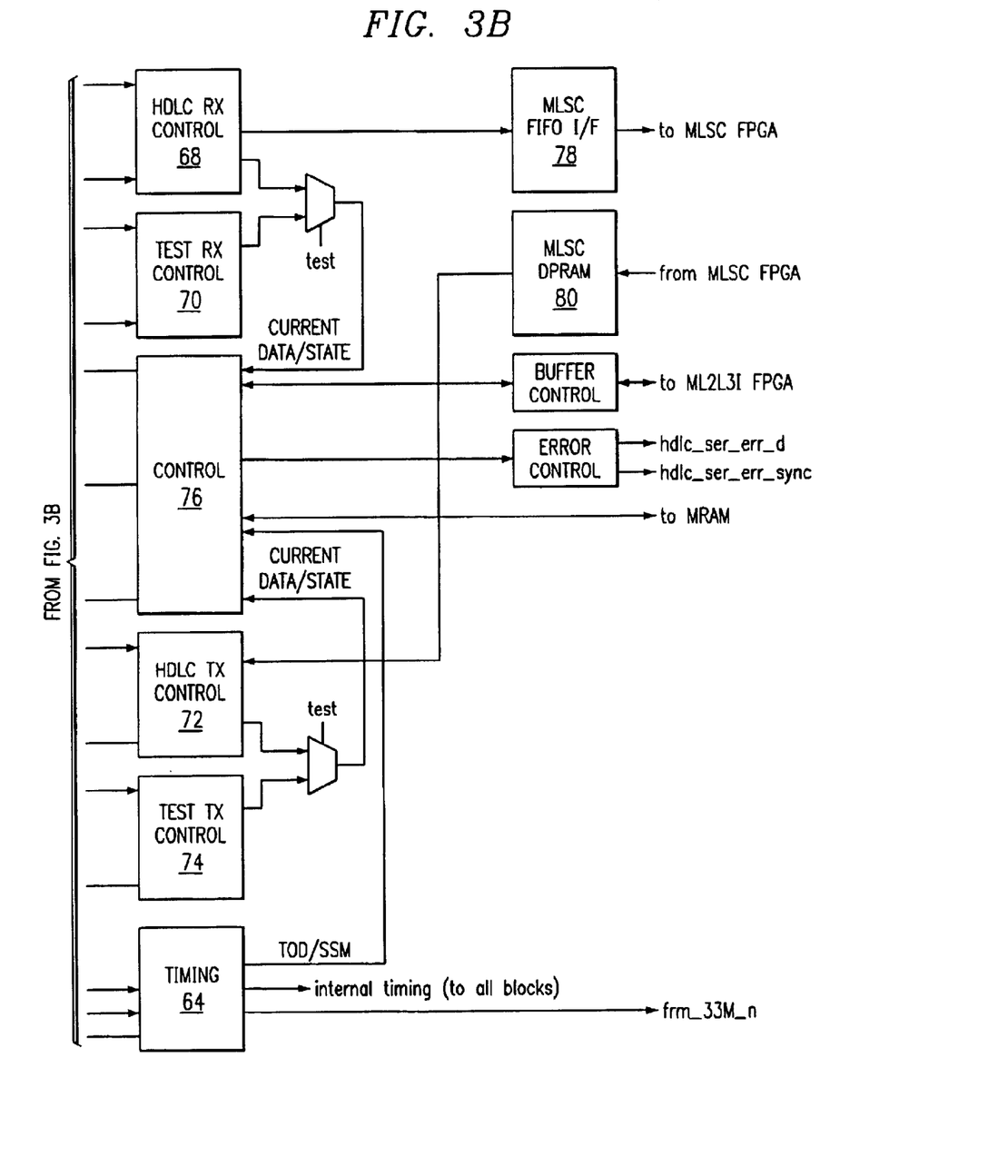

FIG. 3 is a block diagram of HDLC 12. HDLC 12 includes input demultiplexers 50 associated with receive buffers 52 and input demultiplexers 51 associated with transmit buffers 54. Input multiplexers 56 are also associated with receive buffers 52 and input multiplexers 57 are associated with transmit buffers 54. Each of receive buffers 52 and transmit buffers 54 are coupled to pulse code modulated (PCM) links 58 and 60. Each PCM link 58 and 60 carries clock frame and multiplexed serial data. For transmit PCM links 60, data is preferably transmitted on the rising edge of the reference clock signal 62 received at a timing unit 64. Timing unit 64 distributes appropriate clock signals throughout HDLC 12. The transmit frame signal is aligned with a sync signal 66 received by timing unit 64. PCM links 58 and 60 are preferably either T1 or E1 based. Receive PCM links 58 need not be clock or frame aligned with each other or the system timing. the formats of transmit PCM link 60 and receive PCM link 58 are preferably the same. For E1 operation, the serial data stream includes 8 bits from each of 32 channels per frame at a rate of 2.048 MHz. All 32 channels are supported though channels may be enabled/disabled as needed. The frame signal is a one clock wide pulse aligned with the first transmitted bit of the first channel. For T1 operation, the serial data stream includes 8 bits from each of 24 channels at a rate of 1.544 MHz and followed by one unused frame bit. The frame signal is a one clock wide pulse aligned with the frame bit.

There is a receive buffer 52 for each of preferably 64 channels with 32 channels associated with each of the receive PCM links 58. Each buffer is preferably one bit wide and 32 bits deep. The clock and data are sampled by the 33 MHz clock and the data is read on the falling edge of the clock signal on the receive PCM link 58. Data is read out of receive buffers 52 16 bits at a time and sent to a HDLC receive controller 68, a test receive controller 70, or looped back through transmit buffers 54. Data may be in the form of HDLC data or DS0A test data. For HDLC data, from one to all of the 8 bits may include HDLC data (corresponding to data rates of 8 Kbps to 64 Kbps) as determined by individual channel configuration parameters. If the channel is configured for less than 64 Kbps, the extra bits are used as control bits. Preferably, the data bits may start on any of the 8 bits as the configuration is valid and the actual data bits are in contiguous bit positions. Channel rate and start bit parameters are programmable through channel configuration in message memory 22. Receive buffers 52 preferably buffer all 8 bits per each frame of a channel regardless of the actual data rate or number of bits used. If the channel contains DS0A test data, all 8 bits contain valid DS0A test data regardless of the HDLC data rate.

There is a transmit buffer 54 for each channel of transmit PCM link 60. 16 bits are written into a transmit buffer 54 for each channel at every channel processing frame. The data for 24 channels of T1 or 32 channels of E1 or multiplexed together for transmission onto transmit PCM link 60. The transmit frame signal for each transmit PCM link 60 is aligned with the received sync signal 66 and the data carried in each transmit PCM link 60 is aligned with the rising edge of the received reference clock 62. The first 32 channels of either PCM links 58 and 60 map to channels 0–31 and the next 32 channels map to channels 32–63. For T1 operation, the first 24 channels map to channels 0–23 and the second 24 channels map to channels 32–55. Channels 24–31 and 56–63 may be used in channel loopback or channel cross-connect loopback.

Channel processing is performed by HDLC receive controller 68, test receive controller 70, HDLC transmit controller 72, and test transmit controller 74. A control unit 76 determines which channel is to be processed at any given time. An internal channel processing frame of 250 microseconds is generated from sync signal 66 and is two 125 microsecond frames in length. This is then divided into 64 equal periods, one for each channel. At the nominal system clock frequency of 33 MHz, the channel processing frame includes 9250 33 MHz clocks, equivalent to about 128 clocks per channel. Of this, a 96 clock channel processing timeslot is allotted to each of the 64 channels. The 96 clock timeslot out of the possible 128 per channel allows the 33 MHz system clock frequency to vary as low as 25 MHz without causing errors.

At the beginning of each channel's timeslot, the processing controllers will be loaded with the previous states which were stored in the previous frame in message memory 22. Channel data is read from receive buffers 52 and processed by the appropriate state machine controller. After 16 bits are processed, the controller is stopped and the current state is stored in message memory 22. This process is repeated for all 64 channels. Configuration and state data is read at the beginning of each channel processing timeslot and loaded into appropriate registers and state machine controllers. After the data is loaded, the next 16 bits of incoming and outgoing data are processed, which may or may not change the value of the registers and state machine controllers. After the data is processed, the current value of the registers and state machine controllers is written back to message memory 22.

Each of the 64 channels is provisioned by software to be enabled or disabled. An enabled channel indicates that data of some sort is being processed on that channel. A disabled channel indicates that no data is being passed on that channel. Receive data on disabled channels is ignored while an all zeros data pattern is transmitted on disabled channels. An enabled channel has a normal mode and a test mode. a channel in the normal mode processes HDLC data and a channel in the test mode processes DS0A test data. Also, a channel may be inactive while in normal mode. In this situation, the incoming data is monitored for DS0A loopback control codes from the far end. If a loopback control code is detected, then a remote loopback is started.

The current channel configuration register is loaded from message memory 22 into a register at the beginning of each channel processing timeslot. Some of this data, in the enable and test mode bits is stored back into another message memory 22 location at the end of the timeslot. At the beginning of the following timeslot, both the current and previous values are loaded from message memory 22 and compared against each other. If the current and previous states are the same, then no change has been indicated by the software. In this instance, the state machine controllers and registers are loaded with the values stored in message memory 22 state and data areas. If different, software has programmed a change in function and all the registers and state machine controllers are initialized instead of being loaded with the previous values from message memory 22 since the state data in message memory 22 is now old and invalid. In this manner, all state machine controllers and registers will be cleared on a change on state between the HDLC and test mode. This also allows any channel to be reinitialized by setting the enable bit off and on again.

Several types of loopbacks are supported by HDLC 12. Loopback capabilities include channel remote loopback, channel local loopback, system channel cross-connect loopback, PCM link local loopback, and PCM link cross-connect loopback. Channel remote and local loopbacks take precedence over other loopbacks, followed by the system channel cross-connect loopback, the PCM link cross-connect loopback, and the PCM link loopback.

The channel remote loopback places the receive data onto the transmit data for a particular channel. The receive data is still sent to channel processing but the transmit data processing is blocked for that channel. the channel local loopback places the transmit data onto the receive data for a particular channel. The transmit data is still sent out the signaling link but the incoming receive data is blocked and not processed. The system channel cross-connect loopback is used during normal operation to allow performance of background tests on any two unused channels while normal processing is occurring on live channels.

There are two independent local loopbacks for PCM links 58 and 60. Each loopback when set connects transmit PCM link 60 directly to receive PCM link 58. Transmit data is still sent out on the signaling link but incoming data on receive PCM link 58 is blocked. For PCM link cross-connect loopback, two links are connected to each other—a transmit PCM link 60 is connected to its opposite receive PCM links 58. this loopback provides for standalone verification of the functionality of the MTP algorithm at a higher level than can be achieved by PCM link local loopback.

When a channel first goes into HDLC mode, either after initialization or when transitioning from test mode, all of the data and state machine registers are cleared. HDLC receive controller 68 receives 16 bits of incoming data. The channel configuration register specifies how many bits contain HDLC data and which ones do so. Non-HDLC bits are stripped off and valid HDLC bits are processed through a flag detection function. The valid HDLc data is monitored to identify the HDLC flag. If an error is detected, all subsequent data is discarded until a valid flag is detected. An octet counting mode is entered where all bits are counted and an error status is sent to link state controller 14 every 16 octets unit a valid signal unit has been received. An HDLC flag indicates the end of a current signal unit and the beginning of a subsequent signal unit. If multiple flags are received, then the first flag ends the current signal unit and the last flag indicates the start of the next signal unit. All flags are stripped off and the resulting data is passes onto a zero deletion function along with start and end signals indicating the first and last bits of a signal unit.

The zero deletion function removes unnecessary zeros before passing the signal unit to a signal unit reception function along with a bit enable. The signal unit reception function aligns the signal unit data into 8 bit bytes. data is stored until a full byte is available for transfer. A signal unit byte pointer is incremented for every 8 bit byte received and is used to discriminate individual fields inside of the signal unit and also to determine the length of the signal unit. The second byte of a signal unit includes a backwards sequence number and a backwards indicator bit which are registered and stored in message memory 22. The third byte of the signal unit includes the forward sequence number and the forward indicator bit which are registered and stored in message memory 22. The fourth byte of the signal unit includes a length indicator which is registered and stored in message memory 22.

The fourth byte is also used to determine the type of incoming signal unit. If the fourth byte has a value of zero, the incoming signal unit is a fill-in signal unit. If there is a value of one, the signal unit is a link status signal unit with a one byte long service field. If the value is two, the signal unit is a link status signal unit with a two byte service field. If the value is greater than two, the signal unit is a message signal unit. Appendix A shows the types of signal units and their contents.

If the signal unit is a link status signal unit with a one byte service field, the fifth byte is the one byte service field. If the signal unit is a link status signal unit with a two byte service field, the fifth and sixth bytes are the service field. The service field is stored in message memory 22. Length errors are generated for fill-in signal units with a byte pointer count greater than six, for one byte service field link status signal units with a byte pointer greater than seven, for a two byte service field link status signal unit with a byte pointer greater than eight, and for a message signal unit exceeding a preselected byte pointer threshold.

For cyclic redundancy checking (CRC), the CRC value is cleared when an HDLC flag is received. CRC calculation is started with the second byte of the signal unit and continues with all subsequent received bytes. The calculated CRC from all previous bytes is compared against the last two bytes that may contain the transmitted CRC. The result of the comparison, along with the flag detection data, length field data, and maximum length data is used to determine if the CRC is good and thus whether a signal unit is to be received. Transmitted CRC data is found in the fifth and sixth bytes of a fill-in signal unit, the sixth and seventh bytes of a one byte service field link status signal unit, the seventh and eighth bytes of a two byte service field link status signal unit, and the last two bytes of a message signal unit.

For a message signal unit, the data carried therein is placed into a receive buffer of message memory 22. Partial bytes of data are stored in a receive state area of message memory 22. As soon as the first full 4 byte word is received, it is moved to a location in message memory 22 determined by a global configuration register. An address pointer for the location is incremented after each 32 bit word is received. If the end of the message signal unit is detected after only one, two, or three bytes, the partial data is stuffed to a full 32 bit word and stored in the next location. After a complete message signal unit has been received without error, the address pointer is stored for use by interface controller 16. After a complete signal unit of any type has been received, a command is sent to link state controller 14 through a buffer 78.

On the transmission side, transmit data is processed as follows. Continuous flags are transmitted for a period of time while the necessary data to generate a signal unit is retrieved. A transmission request is sent to link state controller 14. The forward sequence number and forward indicator bit is retrieved and the forward sequence number transmit state data is updated. Buffer 80 is monitored until a transmit valid bit is set. One signal unit is transmitted per transmit valid bit. If the signal unit is a message signal unit, the forward sequence number is read to transmit from a transmit buffer 54 indicated by buffer 80 and update forward sequence number transmit state data. Otherwise use the forward sequence number transmit state data for the forward sequence number to use to transmit. A transmit status message is sent to link state controller 14 after transmission starts but before it is completed. Buffer 80 is monitored to determine whether a normal signal unit is to be transmitted or an alternate signal unit is to take its place.

Transmission of data is controlled by HDLC transmit controller 72. 8 bits of data are generated for the channel with the number of HDLC bits determined by channel configuration parameters. Flags between signal units and stuff zeros are generated as required. A read enable signal is used within the transmission function to maintain channel rate independence. Signal unit data is generated based on information in buffer 80. No data is transmitted until buffer 80 receives valid data from link state controller 14. Upon receiving valid data in buffer 80, HDLC transmit controller 72 starts to assemble and output signal units. Buffer 80 includes the information necessary to determine the type of signal unit to generate. After the last data byte is received from buffer 80, HDLC transmit controller 72 calculates a CRC and appends it to the data. Start and end signal unit bits are also inserted. The start and end bits determine where flags are to be inserted between signal units. After flags are inserted, zero insertion occurs. The 8 bit words are created for each channel from valid HDLC data determined after flag and zero insertion. Serial data is then outputted to transmit buffers 54 along with a serial data enable signal in order to transmit the signal unit over PCM link 60. After a signal unit transmission is completed, a status is sent to link state controller 14.

For DS0A test mode operation, a channel is enabled but inactive. Test receive controller 70 and test transmit controller 74 supervise DS0A operation. In this test mode, various types of DS0A loopbacks may be initiated by sending out various control code and data patterns with incoming data monitored for DS0A test codes and for loopback data verification. In the DS0A test mode, 8 bits of data are used regardless of the data rate configuration parameters. DS0A control codes and test data are preferably transmitted MSB first as opposed to LSB first transmitted HDLC data. in general there are three types of loopbacks that may be initiated for a channel in the DS0A test mode. These include a latching loopback, a non-latching loopback, and a data only loopback. in each case, a test data pattern is transmitted and the receive circuitry monitors the incoming data for the same test data pattern for appropriate status responses.

For the latching loopback, a particular sequence of DS0A control codes are transmitted. An external network element should recognize the sequence and provide a remote loopback to bring the data back to the local system. Once in place, the latching loopback remains until another particular sequence of DS0A control codes is transmitted that causes the external network element to remove its remote loopback. Once set up, a data test pattern is transmitted and the receive circuitry monitors the incoming data for the same pattern and provides status on the results. For a non-latching loopback, a control code is sent for a given period of time followed by an alternating pattern of control code and test pattern. The loopback is removed by halting the transmission of the alternating control code and test pattern and transmitting an idle data pattern. The incoming data is monitored and compared to the expected alternating pattern. Results of the comparison are stored in message memory 22. For a data only loopback, a specific pattern is transmitted and the incoming data is compared against the transmitted pattern. No loopback control codes are used. Test receive controller 70 monitors incoming data for a DS0A test code. If detected, test receive controller 70 initiates a remote loopback to return any test pattern to the far end. Test receive controller also monitors the incoming data to detect for the removal of the DS0A test.

Message memory 22 has several functions, including message buffers for each channel, global configuration/status, channel configuration/status, and HDLC state data. Each channel is allocated a block of memory large enough to hold two receive and two transmit message signal units in addition to status data, configuration data, and state data. Message memory is initialized before HDLC 12 becomes operational.

Figure 4:
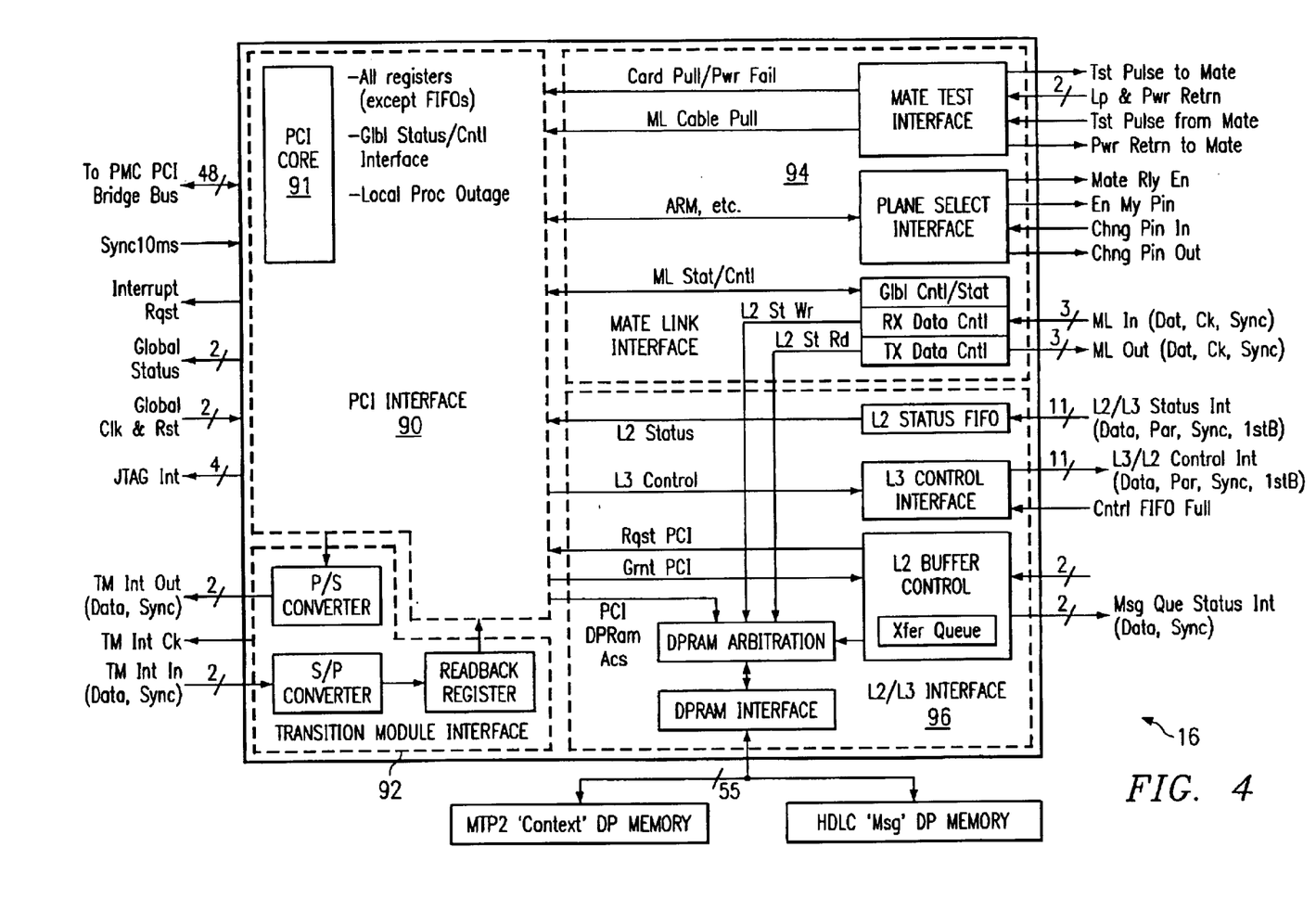
FIG. 4 illustrates a block diagram of an interface controller in the signaling unit.

FIG. 4 is a block diagram of interface controller 16. Interface controller 16 includes a PCI interface 90, a transition module interface 92, a mate link interface 94, and a L2/L3 interface 96. PCI interface 90 contains the connections to PCI bridge 20. PCI interface 90 includes a PCI core 91 that supports memory read, memory write, configuration read, and configuration write commands. PCI core 91 is capable of being an initiator and a target. PCI interface 90 communicates with reconfiguration controller 18 to update its status register whenever new status becomes available. In turn, reconfiguration controller 18 manages its interrupt enable register, reading and clearing of the status register, and generation and clearing of interrupts to PCI interface 90.

Transition module interface 92 provides a connection between the PCI bus and the transition module control/status information. Transition module interface 92 handles DS0A transition modules and T1/E1 framer functions. A write transaction to transition module interface 92 begins with a PCI write operation to interface controller 16. Transition module interface 92 includes a parallel-to-serial converter 100, which converts this access to serial command output streams. The transition module writes this data to the appropriate location downstream and respond back to interface controller 16 with response information. For a read transaction, a PCI read operation is made to interface controller 16. Transition module interface 92 converts this PCI access to serial command output streams. The transition module will read this data from the appropriate location downstream and respond back to interface controller 16 with response information. A readback register 104 and a serial-to-parallel converter 102 are used for this function. The host processor is alerted if a timeout/no response, no parity, or operation failure occurred.

Mate link interface 94 keeps the active and standby PMC card state machines in sync at the MTP Level two level by sending layer 2 state information and sequence numbers from the active card to the standby card. This information is transferred to the layer 2 interface on the standby card in order maintain synchronization in the event of a plane switch to the standby card. The goal of this data transfer is to maintain the state of any links which are not in an outage condition at the time of a plane switch operation. Mate link interface 94 also monitors the functional sanity of each card, including itself, by interpreting hardware and software status messages. Mate link interface 94 is a bit mapped serial link continuously transmitted between the active and standby cards in both directions.

When a card comes up from system reset, both of the mated cards will download configuration data from the system level into their local host processors. The determination of which of the two cards is active and which is standby is included in the download. The host processor on the active card will initialize its level 3/level two state machines first and send out a handshake message to the system software when initialization is complete. Upon acknowledgment of the handshake message, the active card should enable the mate link outputs and send data over the mate link to the standby card. Once the standby card begins to receive data over the mate link, the standby card will continuously inherit the state of the corresponding links on the active card via the mate link transfer of state and sequence number data to link state controller 14 on the standby card.

To facilitate controlled plane switching between the standby and active cards, while maintaining links in an in-service condition, layer 2 state machines are synchronized between the two cards. To accomplish this, per channel messages are received from link state controller 14 on the active card over the L2/L3 status interface 96, passed over the mate link to the standby card, and transferred to link state controller 14 on the standby card over its L3/L2 interface. The messages include the channel number, the MTP2 state, forward and backward sequence numbers and indicator bits needed to synchronize the MTP2 state machine.

L2/L3 interface 96 includes a memory interface 110, a memory arbitrator 112, a buffer controller 114, a controller interface 116, and a status buffer 118. L2/L3 interface 96 is responsible for transfer of message data between the host card memory and message memory 22 and communication between the host processor layer 3 and link state controller 14 layer 2 status and control information. L2/L3 interface 96 uses one of the ports of both message memory 22 and context memory 24 to avoid contention with other HDLC 121 and link state controller 14 processing.

Memory interface 110 allows for data messages being passed to and from the layer 2 processing to be stored in one or more queue structures in host memory. The queue structures include a list of descriptor table entries which identify the current owner of a message and have a pointer to the physical location of the first byte of the message data buffer in host memory plus the actual memory buffer space for the message data.

Controller interface 116 is responsible for passing L3 control information, generated by the host processor via the PCI bus, to the MTP2 /HDLC functional entities. Controller interface 116 passes data received over mate link interface 94 to link state controller 14. Controller interface 116 also passes global status and error conditions to link state controller 14. Handshake signals, generated internally by interface controller 16, are passed to link state controller 14 and confirm the transfer of particular receive or transmit message buffers between message memory 22 and host memory buffer locations. To facilitate these functions, a parallel output interface to link state controller 14 is implemented. Control interface 116 may receive an indication from link state controller 14 that its control buffer is full so that control information is not lost. L3 commands from the host processor are provided to link state controller 14. The L3 commands include the link number, the command indentifier, and the actual command code. Some of the data from mate link interface 94 is passed to link state controller 14.

Status buffer 118 passes L2 state machine and output change status information, generated by MTP2 /HDLC functions, to the host processor. Status buffer 118 receives commands from link state controller 14 for output to mate link interface 94. Handshake signals generated by link state controller 14 are received that confirm reception or transmission of particular receive or transmit message buffers in message memory 22. To facilitate this information flow, a parallel input interface from link state controller 14 is implemented. Level two status message are received by status buffer 118 for access by the host processor. Whenever status buffer 118 is not empty, an interrupt is sent to the host buffer and the host buffer will read out the information in status buffer 118 until it is empty. State and sequence number data are provided by link state controller 14 for transmission over the mate link to the standby card. This allows for plane switch operations to occur without the loss of critical MPT2 information. L2 status interface messages are also received from link state controller 14 and communicate buffer state changes in message memory 22.

For inbound layer 2 to layer 3 message handling, once a message has been processed and placed in message memory 22, link state controller 14 sends information to status buffer 118 that includes the channel number and buffer location of the message that is ready for transfer. Receive messages are transferred between message memory 22 and host memory buffers in the order in which they are received. This transfer occurs by fetching the descriptor table pointer entry for the respective inbound link queue and initiating a PCI bus transfer of the message data from message memory 22 to the host memory buffer location. Once the burst data transfer is complete, L2/L3 interface 96 sends an acknowledge of the transfer to link state controller 14 by generating information at controller interface 116.

For outbound layer 3 to layer 2 message handling, once an outbound message buffer in message memory 22 for any link is empty, link state controller provides the channel number and buffer location of the transmit buffer that is ready to be filled to status buffer 118. Transmit messages are transferred between the host memory buffers and message memory 22 using a round-robin technique. This transfer occurs by reading the next forward sequence number for this channel from context memory 24, fetching the descriptor table and point entries for the outbound link queue, and initiating a PCI bus transfer of the message data from the host memory buffer location to message memory 22. The position in host memory of all outbound messages for transmit is directly related to their forward sequence number. Since the forward sequence number is provided by MTP2 circuitry, all message acknowledge and retransmission functions are tracked and initiated by link state controller 14. Once the burst data transfer is complete, L2/L3 interface 96 sends an acknowledge to link state controller 14 through controller interface 116.

As described, signaling link interface 10 provides a hardware implementation for functions conventionally performed by software. Signaling link interface 10 preferably uses field programmable gate arrays (FPGAs) in its circuitry to handle all operating functions. The use of FPGAs reduces the previous dependency on software and multiple processors required to accomplish several tasks. The FBGAs are preferably flash loadable devices to allow for remote configuration capability. The FPGAs may be configured for design debug testing as well as field changes and upgrades. Higher performance MTP level two processing is achieved with increased reliability and faster execution capability.

Thus, it is apparent that there has been provided in according with the present invention, a signaling link interface for processing signaling information in a telecommunication network that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

Appendix a

Implementation of algorithm and timer unit 36 takes into account that the delimitation, alignment, and error detection for receiving and transmitting blocks has been moved to HDLC 12 and interface controller 16 detects local processor outage. Link state control and initial alignment control have been combined into a single link state control. The following discrepancies are noted between the standard T1.111.3 drawings and algorithm and timer unit 36 implementation:

preventive cyclic retransmission is not supported and thus not shown.

the L3/MGMT interface is noted as ML2L3I (interface controller 16).

the Errored Interval Monitor (for 1.536 Mbit/s links) has been removed.

the "Invalid Command LSC→ML2L3I" output has been added.

the "START→DAEDR" command has been removed.

HDLC 12, which handles the DAEDR functions, will run continuously. LSC 14 will still process events from HDLC 12 before the start command has been issued, however since the LSC is in the "out of service" state during this time, results from HDLC 12 will be automatically ignored.

added T88 (idle link) logic to the reception control and link state control. This is the "link failure/idle link RC→LSC" command.

a "FISU/MSU received RC→LSC" command during processor outage generates a "remote processor recovered LSC→ML2L3I" event only if the remote processor is out.

The following discrepancies are noted between the standard Q.703 algorithm and algorithm and timer unit 36 implementation:

the Processor Outage Block (POC) is not shown since its part of the LSC.

the Q.703's "Local Processor Recovered MGMT→LSC" command is synonymous with the "Resume MGMT→LSC" command.

the "align FSNX LSC→RC" command does not exist in Q.703.

Each flowchart is preceded by a table that describes a block interface and storage elements.

Inputs from event queues—these are registered inputs from ML2L3I (from layer 3 and management layer).

Inputs from other MTP2 blocks—these are combinational inputs from other MTP2 algorithm blocks.

Outputs to other MTP2 blocks—these are combinational outputs to other MTP2 blocks.

Outputs to HDLC—these are registered outputs to the HDLC.

Outputs to ML2L3I—these are registered outputs to the ML2L3I.

Storage—these are input/outputs that are stored in context memory 24.

What is claimed is:

1. A signaling link interface for processing signaling information in a telecommunications networks comprising:

a high level data link controller operable to receive signaling information from and provide signaling information to network elements in the telecommunications network, over plural signaling links, and further operable to initiate events, initiating a different event associated with each one of the signaling links in response to receiving said signaling information over said one of the links;

a context memory;

a link state controller operable to perform message transfer part level two (MTP-2) processing on the signaling information received by the high level data link controller, the link state controller performing the message transfer part level two processing using a state machine in order to provide a hardware implementation, said link state controller including an event queue circuit operable to store said events, an MTP-2 processing algorithm circuit operable to receive data associated with an event and perform MTP-2 processing thereon, including providing a new state for the link associated with the event, and a context switch operable to select an event from the event queue circuit and load data corresponding to the selected event into the MTP-2 processing algorithm circuit for processing and to store, in the context memory, the new link state provided by the MTP-2 processing algorithm circuit upon processing of the loaded data.

2. The signaling link interface of claim 1, wherein the high level data link controller and the link state controller are implemented in field programmable gate array devices.

3. The signaling link interface of claim 2, wherein the field programmable gate array devices are flash loadable to allow for remote configuration capabilityhigh level data link controller and the link state controller are operable to be downloaded from a remote site.

4. The signaling link interface of claim 1, further comprising:

a message memory operable to store data associated with signaling information for reception and transmission through the high level data link controller.

5. The signaling link of claim 1, further comprising: a wherein said context memory is operable to provide state and control information to the link state controller associated with a signaling link carrying received signaling information.

6. The signaling link interface of claim 1, further comprising:

an interface controller operable to provide system access to the high level data link controller and the link state controller.

7. The signaling link interface of claim 6, further comprising:
a redundant link state controller operable to perform message transfer part level two processing on the signaling information, the redundant like link state controller operable to receive state and link information in order to synchronize the redundant link state controller to the link state controller.

8. The signaling unit interface of claim 7, wherein state and link information is passed from the link state controller for the redundant link state controller by the interface controller.

9. The signaling link interface of claim 7, wherein state and link information is continuously sent from the link state controller to the redundant link state controller.

10. The signaling link interface of claim 1, wherein signaling link information is received by the high level data link interface over T1 or E1 signaling links.

* * * * *